United States Patent Office 3,357,923
Patented Dec. 12, 1967

3,357,923
SURFACE CLEANING PREPARATION
Marvin S. Wool, Sanford Lebman, and Irvin Feldman, St. Louis County, Mo., assignors to St. Louis Janitor Supply Co., doing business as Navy Brand Manufacturing Company, St. Louis, Mo., a corporation of Missouri
No Drawing. Filed June 10, 1965, Ser. No. 463,025
3 Claims. (Cl. 252—157)

This invention relates in general to cleaning agents and, more particularly, to a preparation for effecting the cleansing of the walls of drain pipes, sewers, and the like.

It is an object of this invention to provide a preparation which is adapted for prompt and effective cleansing of the walls of drain pipes, sewers, and like liquid passageways which is self-sufficient, not requiring the application of heat or any other extrinsic elements or expedients.

It is another object of the present invention to provide a preparation of the type stated which is adapted to effect removal of deposits upon the walls of drain pipes, sewers, and the like, and to restore liquid flow through a unique combination of chemical reaction and mechanical action.

It is a further object of the present invention to provide a preparation of the type stated which is adapted during usage to produce a shock effect of substantially greater magnitude than in compositions heretofore known for disrupting the adhesion of deposits upon the walls of drain pipes and the like which have heretofore proved highly resistant to removal, as well as to bring about restoration of liquid flow.

It is an additional object of the present invention to provide a preparation of the type stated which is adapted for effecting a temporary sealing action during usage so as to measurably lengthen the period of activity of the preparation so that a single usage will achieve results hitherto unattained except through repeated operations.

It is a still further object of the present invention to provide a preparation of the type stated which will cause the cleansed wall surfaces to have applied thereon a coating which will tend to resist subsequent deposition of foreign matters thereon.

It is another object of the present invention to provide a preparation for cleansing of the walls of drain pipes, sewers and the like which may be most economically produced; which may be used by relatively unskilled personnel; the use of which constitutes marked savings in time and chemical consumption; and which is safe and reliable in usage.

With the above noted objects in view, our invention resides in the novel compositions, methods and processes presently described in the following specification and pointed out in the claims.

In essence, the present invention contemplates a cleansing composition for use in removing the foreign matter, commonly referred to as sludge, which develops on the walls of drain pipes, sewers and other liquid conduits, accumulating and building up during usage to a thickness which will materially impede liquid flow and ultimately block same entirely unless appropriate, timely, periodical efforts are made to effect removal of such deposits.

The so-called sludge is comprised primarily of organic matter such as greases, oils, and other hydrocarbons which are non-water soluble. The necessity of inhibiting the development of such accumulations for other than effecting or restoring liquid flow is manifestly of extreme importance wherein the particular conduit is designed for heat transfer purposes. The composition of the present invention comprises basically a metal in powder form of exceedingly fine mesh and an inorganic, powdered alkali, the surface of the particles of which are uniquely and intimately coated with the powdered metal so that upon the subjection of the composition to water a highly, relatively violent, substantially instantaneous, exothermic reaction develops whereby in addition to a saponification of the organic foreign matter there is produced an accompanying mechanical shocking effect which jars normally tenacious matter loose from the conduit walls being treated.

The components of the preparation of this invention are aluminum powder having a mesh of approximately 325, being thus of extreme fineness and of such minuscule character as to, when in the free state, tend to linger in the atmosphere; a strong inorganic base being preferably sodium or potassium hydroxide; and a relatively weak inorganic acid salt, such as sodium bicarbonate.

The aluminum powder utilized should be coated with an organic fatty acid salt, preferably a stearate.

In formulating and preparing the compositions of the present invention from the foregoing ingredients, it is to be recognized that a relatively substantial range of proportions is available so that varying intensities of action may be provided.

Generally, the following would constitute the effective proportionality of the components:

| Ingredients: | Volume by weight, percent |
|---|---|
| Stearate-coated aluminum powder | .1 to 10 |
| Sodium bicarbonate | 4 |
| Sodium, or potassium hydroxide | 86 to 95.9 |

However, as merely exemplary of a formulation which has proved in practice to be suitable for the average conditions to be treated, are the following:

| Ingredients: | Volume by weight, percent |
|---|---|
| Stearate-coated aluminum powder | 1 |
| Sodium bicarbonate | 4 |
| Sodium, or potassium hydroxide | 95 |

In order to prepare a composition in accordance with the present invention, the powdered ingredients, namely the fine mesh aluminum, sodium hydroxide, and sodium bicarbonate in the proportions stated are placed in a suitable closed vessel or container and mechanically stirred, vibrated, or otherwise agitated so as to effect a full intermixture whereby the fine aluminum particles will adhere to the surfaces of the particles of sodium hydroxide, comprehensively coating same. Such an adherence is of a most intimate nature being of a physico-chemical character and considerably maintained by a secondary polar force. Thus the entire surface of the particles of sodium hydroxide are in contact with the powdered aluminum whereby maximum interface is achieved. It has been found that without the requisite agitation the aforesaid coating of the hydroxide particles does not develop with marked diminution in the effectiveness of the composition when used.

In practice, a composition prepared in accordance with the foregoing is discharged into a conduit to be cleaned and then water is introduced into such conduit if sufficient water is not already therein or habitually flowing therethrough, whereupon a series of reactions immediately develops. The fine aluminum powder having through its fineness maximum surface for reaction immediately reacts with the sodium hydroxide coated thereby to form sodium aluminate in an exothermic reaction of substantial extent, increasing the temperature more than 25° F. which is markedly higher than that obtained by presently used compounds within the same time period. Hydrogen is released relatively violently, and with considerable force, the explosiveness of which creates shock waves within the conduit for mechanically conducing to the loosening of material from the conduit walls, as well as breaking flow-impeding particles into small components for exposure of greater surface thereof for chemical reaction. The hydrogen thus released will bubble upwardly within the conduit toward the liquid surface, imparting an effervescent character to the solution so that a relatively constant, desired agitation is brought about. The fine aluminum powder tends to rise to the surface of the solution and, through its substantial lack of weight, float thereon, forming a seal, as it were, so as to block the release of hydrogen and heat to the atmosphere, thereby prolonging the cleansing action and obviating the heretofore accepted repetition of treatment.

The heat of reaction will also effect generation of carbon dioxide from the sodium bicarbonate and thereby provide a further agitating gaseous matter to the solution. Since upon hydrolysis some carbonic acid will be formed from the sodium bicarbonate, the hydrogen thereof will also constitute a further source of hydrogen for gaseous energy for the solution.

That portion of the sodium or potassium hydroxide which does not react with the aluminum is thus available for saponifying the greases and fats and other ester formations in the sludge for producing water soluble acid salts, such as for instance, sodium citrate, and the like which, being soluble within the aqueous environment, go into the solution for disposal.

After termination of the cleansing action, as by discharge of the solution, the walls of the conduit so treated will prove to have a very smooth, glassy-like surface character; the same having been imparted thereto by the fatty acid salt coating on the aluminum powder which thus forms a protective layer which, in practice, has proved markedly resistant to the development of subsequent sludge accumulations.

It will be appreciated that the aforesaid coating upon the aluminum powder renders same substantially proof against hydration, as by atmospheric moisture, so that the said preparation may be retained against future usage for extensive periods of time without danger of undesired diminution in the properties thereof. Furthermore, the fatty acid salt coating of the fine aluminum powdered particles serves to prevent agglomeration of the particles so that the same maintain their discrete independent character pending adherence upon the outer surfaces of the hydroxide.

It will be recognized that in formulations heretofore utilizing aluminum granules, relatively less violent and less rapid reactions will develop in usage in view of the differential in mesh size of the granules as compared to the powder. The granules being of relative weight will tend to drop downwardly within the solution, collecting upon the base of the container so that only a limited surface is available for reaction, being the interface between the granules and the sodium hydroxide. Thus, the reactions will be comparatively slow but with limited resulting effervescence so that the mechanical effect is of considerably reduced proportions when considered in light of the forceful release of gases by utilization of the present invention. Additionally, since the granules will sink to the bottom the same cannot, perforce, create the surface seal as developed by use of the finely divided aluminum powder so that gases bubbling upwardly will be quickly released to the atmosphere rather than retained for continuing jarring action.

Thus, in view of the foregoing, it will be appreciated that compositions formed in accordance with this invention may be readily produced; and may be utilized without the necessity of expert skills on the part of the users so that such preparations are available for both home and industrial purposes. Furthermore, despite the stated relative violence of the reaction, the same does not reach such levels as to cause any danger of injury to attendant personnel and is thus, though completely efficacious in usage, harmless to the users.

Due to the nature of the reaction brought about by the use of the present invention when subjected to water, it is understandably preferable that the present invention be utilized for cleansing the surfaces of confined receptacles so that the forces released are not dissipated but are utilized upon the surrounding surfaces. Thus, the present composition would find primary utilization within the pipes, tubes and the like as distinguished from a planar surface exposed to the atmosphere.

It should be understood that changes in the methods, compositions, percentages and combinations set forth may be made without departing from the nature and principle of our invention.

Having thus described our invention, what we desire to obtain by Letters Patent is:

1. A cleansing agent for treating surfaces of a liquid receptacle for effecting removal of deposits therefrom and to restore liquid flow consisting essnetially of .1% to 10% by weight of finely divided powdered aluminum having a mesh size of approximately 325, said aluminum powder being coated with a salt of stearic acid, and of 86% to 95.9% by weight of a strong inorganic alkali from the class consisting of sodium and potassium hydroxide, said alkali being in powdered form, the powdered aluminum adhering to the surfaces of said powdered alkali, and of 4% by weight of a relatively weak inorganic acid salt from the class consisting of sodium bicarbonate.

2. A cleansing agent for treating surfaces of a receptacle for effecting removal of deposits therefrom consisting essentially of:

| Ingredients: | Volume by weight, percent |
|---|---|
| Stearate-coated aluminum powder having a mesh size of approximately 325 | .1 to 10 |
| Sodium or potassium hydroxide | 86 to 95.9 |
| Sodium bicarbonate | 4 |

3. A cleansing agent for treating surfaces of a receptacle for efficient removal of deposits therefrom consisting essentially of:

| Ingredients: | Volume by weight, percent | |
|---|---|---|
| Stearate-coated aluminum powder having a mesh size of approximately 325 | Approximately | 1 |
| Sodium or potassium hydroxide | do | 95 |
| Sodium bicarbonate | do | 4 |

References Cited

UNITED STATES PATENTS

| | | | |
|---|---|---|---|
| 2,773,040 | 12/1956 | Walton | 252—157 |
| 2,169,344 | 8/1939 | Kimball | 252—157 X |
| 2,497,057 | 2/1950 | Pape et al. | 252—157 X |
| 3,077,455 | 2/1953 | Racke | 252—157 |

LEON D. ROSDOL, *Primary Examiner.*

SAMUEL H. BLECH, *Examiner.*

J. T. FEDGAN, *Assistant Examiner.*